United States Patent
Holyoake et al.

(10) Patent No.: US 11,181,437 B2
(45) Date of Patent: Nov. 23, 2021

(54) DETERMINING STRUCTURAL INTEGRITY OF A RAISED FLOOR

(71) Applicant: International Business Machines Corporation, Armonk, NY (US)

(72) Inventors: Colin Ian Holyoake, Braishfield (GB); Michael James Bettle-Shaffer, Hampshire (GB); Maurice Francis Gray, Whitchurch (GB); Graham Jon Eames, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/671,491

(22) Filed: Nov. 1, 2019

(65) Prior Publication Data
US 2021/0131909 A1 May 6, 2021

(51) Int. Cl.
*G01M 5/00* (2006.01)
*E04F 15/024* (2006.01)

(52) U.S. Cl.
CPC ..... *G01M 5/0033* (2013.01); *E04F 15/02452* (2013.01); *E04F 15/02458* (2013.01); *G01M 5/0091* (2013.01)

(58) Field of Classification Search
CPC ............... G01M 5/0033; G01M 5/0091; E04F 15/02452; E04F 12/02458
See application file for complete search history.

(56) References Cited

U.S. PATENT DOCUMENTS

| | | | |
|---|---|---|---|
| 9,370,125 B2 * | 6/2016 | Abuelsaad | H05K 7/20745 |
| 9,923,766 B2 | 3/2018 | Palmer et al. | |
| 9,938,728 B2 | 4/2018 | Kugler et al. | |
| 10,119,278 B1 * | 11/2018 | Canfield | E04F 17/08 |
| 10,231,362 B1 * | 3/2019 | Drewery | H05K 7/1497 |
| 2004/0055232 A1 * | 3/2004 | Jette | H02G 3/285 52/220.1 |
| 2009/0090073 A1 * | 4/2009 | Bravo | H02G 3/0608 52/220.1 |
| 2009/0113323 A1 * | 4/2009 | Zhao | H05K 7/20836 715/764 |
| 2015/0025690 A1 * | 1/2015 | Abuelsaad | G05D 23/1934 700/276 |
| 2020/0084912 A1 * | 3/2020 | Slessman | H05K 7/1497 |
| 2020/0173177 A1 * | 6/2020 | Stillig | E04F 15/02405 |

OTHER PUBLICATIONS

Jose Miguel Lopez-Higuera et al., Fiber Optic Sensors in Structural Health Monitoring, Feb. 15, 2011, Journal of Lightwave Technology, vol. 29, No. 4, p. 587-608 (Year: 2011).*
Seubert, C., "How Do Laser Distance Meters Work?" Sciencing, Apr. 25, 2017, 2 pages. https://sciencing.com/do-laser-distance-meters-work-6332366.html.

* cited by examiner

*Primary Examiner* — Stephanie E Bloss
(74) *Attorney, Agent, or Firm* — Jorge R. Maranto

(57) ABSTRACT

Concepts for determining a structural integrity of a raised floor comprising an array of stringers and stanchions are presented. Each stringer is supported at opposite ends by a respective pair of stanchions. One example comprises a system having a transmitter configured to transmit a signal between a pair of stanchions via a respective stringer and a receiver configured to receive the transmitted signal. The system further comprises a processing unit configured to determine a status of the stringer based on the received signal, then determine an indicator of a structural integrity of a raised floor based on the determined status.

19 Claims, 6 Drawing Sheets

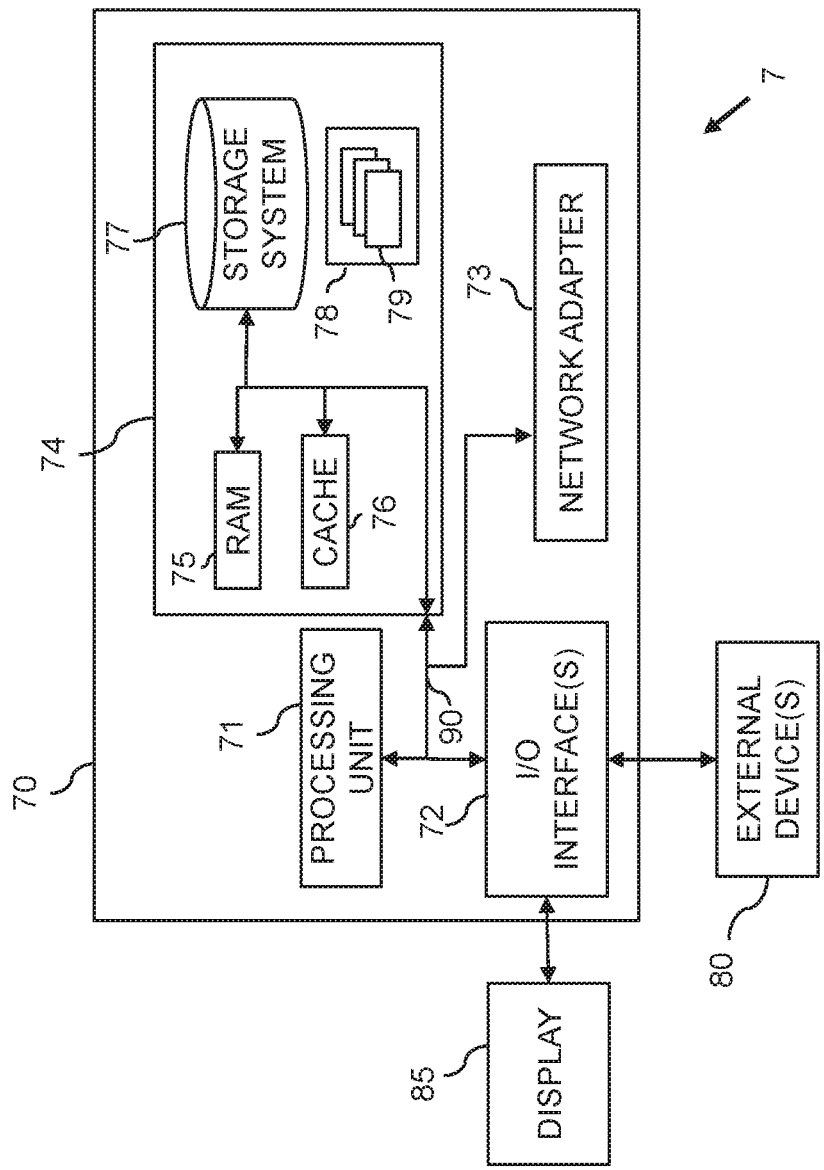

DETERMINING STRUCTURAL INTEGRITY OF A RAISED FLOOR

BACKGROUND

The present disclosure relates generally to raised flooring, and more particularly to determining structural integrity of a raised floor comprising an array of stanchions and stringers.

The present disclosure also relates to a system for determining a structural integrity of a raised floor comprising an array of stanchions and stringers.

Raised floors are widely used in modern office buildings, and in specialized areas such as command centers and data centers, where there is a requirement to route mechanical service and cables, wiring, and electrical supply. Traditionally, a raised floor (for example that of an information technology data center or computer/server room) provides an elevated structural floor above a solid substrate (often a concrete slab) to create a hidden void for the passage of mechanical and/or electrical services. Such raised floors typically comprise an array of stringers and stanchions (i.e. an underpinning grid infrastructure) and structural floor tiles that are supported on top of the array. Additional structural support and lighting are often provided when a floor is raised enough for a person to crawl or even walk beneath the floor for maintenance purposes.

An issue with raised floors arises when ascertaining whether the structural integrity of the raised floor has been compromised. For example, the stringers and/or stanchions of the raised floor array can be damaged, misaligned, or missing after being removed for maintenance work without the subsequent correct re-installation. The raised floor may appear structurally sound; however, the underpinning infrastructure (i.e. the array of stringer and stanchions) could be at risk of overloading, twisting, and even collapsing due to a possible issue not visible from above the raised floor.

Also, when a raised floor is located within an area prone to environmental risks (e.g. an earthquake zone), further issues can arise where vibrations and shifting of a building (for example caused by an earthquake) may move the flooring apparatus (i.e. the array of stringers and stanchions) without the raised floor appearing altered or damaged. Consequently, the risk of the raised floor collapsing may be increased, which presents a serious health and safety issue for the users of the raised floor (who may not be aware of the damaged structural integrity of the raised floor).

SUMMARY

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

The present disclosure seeks to provide a system for determining a structural integrity of a raised floor comprising an array of stanchions and stringers, each stringer being supported at opposite ends by a respective pair of stanchions.

The present disclosure also seeks to provide a method for determining a structural integrity of a raised floor comprising an array of stanchions and stringers, each stringer being supported at opposite ends by a respective pair of stanchions.

According to an aspect of the disclosure, there is provided a system for determining a structural integrity of a raised floor comprising an array of stanchions and stringers, each stringer being supported at opposite ends by a respective pair of stanchions. The system comprises a transmitter configured to transmit a signal between a pair of stanchions via a respective stringer. The system further comprises a receiver configured to receive the transmitted signal. The system further comprises a processing unit configured to determine a status of the stringer based on the received signal, and to determine an indicator of a structural integrity of a raised floor based on the determined status.

According to another aspect of the present disclosure, there is provided a method for determining a structural integrity of a raised floor comprising an array of stanchions and stringers, each stringer being supported at opposite ends by a respective pair of stanchions. The method comprises transmitting a signal between a pair of stanchions via a respective stringer and receiving the transmitted signal. The method then comprises determining a status of the stringer based on the received signal, and determining an indicator of a structural integrity of a raised floor based on the determined status.

According to yet another aspect of the disclosure, there is provided a computer program product for determining a structural integrity of a raised floor comprising an array of stanchions and stringers, each stringer being supported at opposite ends by a respective pair of stanchions. The computer program product comprises a computer readable storage medium having program instructions embodied therewith, the program instructions executable by a processing unit to cause the processing unit to perform a method according to a proposed embodiment.

BRIEF DESCRIPTION OF THE DRAWINGS

Preferred embodiments of the present disclosure will now be described, by way of example only, with reference to the following drawings, in which:

FIG. 6 is a simplified block diagram of an exemplary embodiment of a system for determining a structural integrity of a raised floor comprising an array of stanchions and stringers, accordance with embodiments of the present disclosure.

Figure 1:
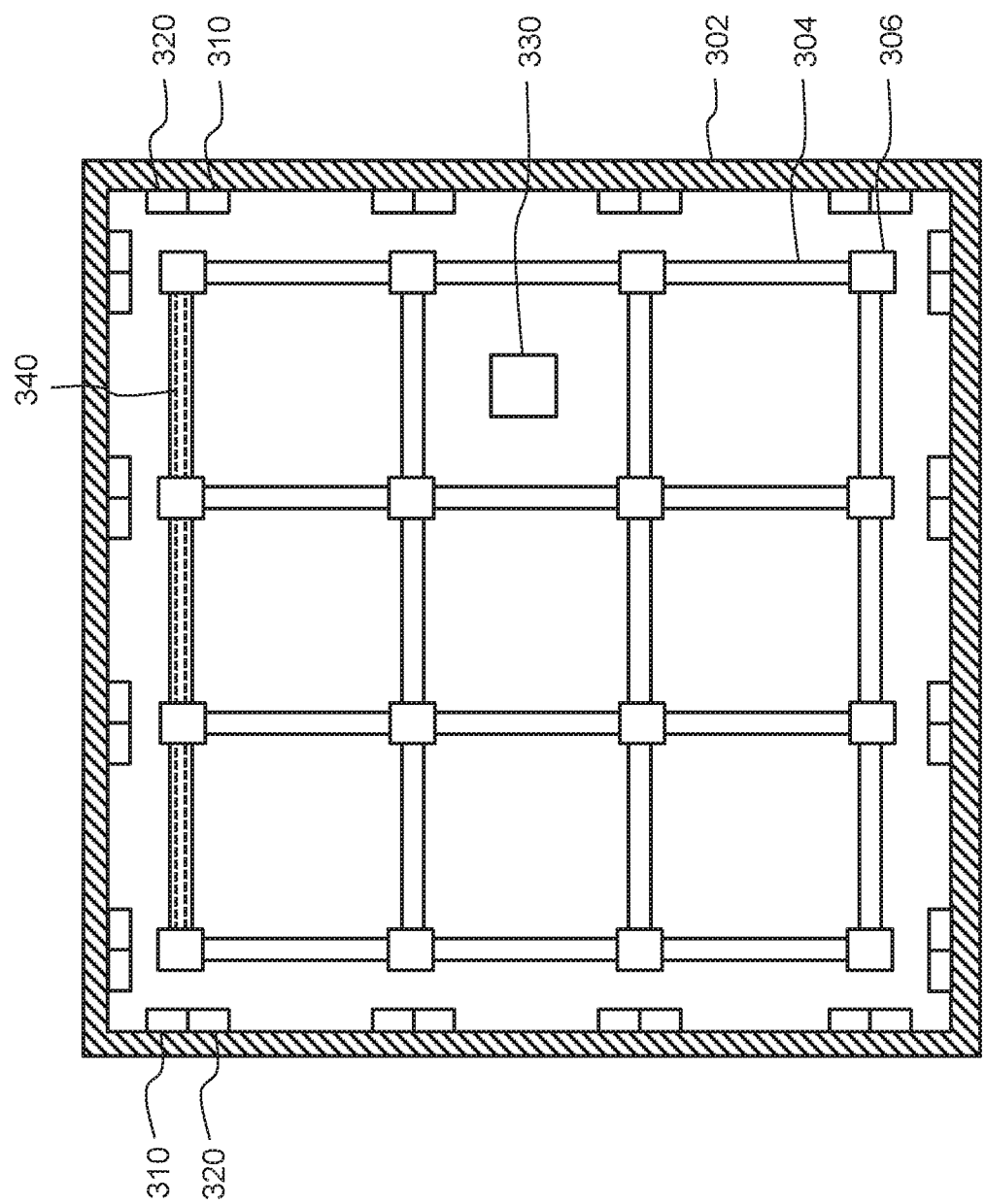
FIG. 1 is a simplified diagram of an exemplary embodiment of a system for determining a structural integrity of a raised floor comprising an array of stanchions and stringers, each stringer being supported at opposite ends by a respective pair of stanchions, accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Concepts for determining a structural integrity of a raised floor comprising an array of stanchions and stringers are proposed. Structural integrity in the context of a raised floor comprising an array of stanchions and stringers may be regarded as the ability of the raised floor to support a designed structural load without breaking or collapsing. Thus, a measure or indication of structural integrity may provide a quantifiable classification useful for assessing whether a structure is fit to withstand its expected service conditions safely and reliably.

Such concepts may involve a concept of verifying the structural continuity and/or integrity of a raised floor by way of signal analysis and alerting. It is proposed to employ a system such that a break in the physical structure of the raised floor (i.e. the array of stringers and stanchions) may affect a signal transmitted by way of a transmitter and received by way of a receiver. In some embodiments, the affected signal enables the identification of the distance and/or location of the break in the structure.

Embodiments may therefore be implemented in conjunction with a conventional raised floor comprising an array of stringers and stanchions. For instance, embodiments may be retro-fitted to a convention raised floor. Stringers are structural elements/beams comprising longitudinal support members that are typically installed such that their longitudinal axis extends generally horizontally, whereas stanchions are installed as generally upright/vertical bars, posts, or frames forming a structural support for the stringers. In a raised floor, the array of stringers and stanchions may be covered by floor tiles, where each floor tile is supported by the array of stringers and stanchions. The stringers and stanchions may be made of rigid material and are typically metal, for example steel.

Proposed embodiments may employ a concept for determining a structural integrity of a raised floor by implementing grid awareness in the array of stringers and stanchions. Thus, an intelligent flooring system may be provided as a grid network (i.e. a mesh network), and an issue with one of the stringers of the array of stanchions and stringers may be detected by way of a transmitted signal, wherein a detected issue may trigger an alert. Such an alert may comprise a message (e.g. an e-mail, text message, etc.), a push notification (e.g. an SMTP trap), or a visible notification (e.g. illumination of a light).

Accordingly, a provision of a processing unit is configured to determine a status of a stringer based on a received signal (e.g. variation of the signal from an expected value), and further determine an indicator of a structural integrity of a raised floor based on the determined status. In this way, the structural continuity and/or integrity of the raised floor may be automatically determined based on signal monitoring techniques.

Embodiments may facilitate the concept of checking a message or signal continuity hosted by the array of stringers and stanchions, where the message or signal may be transmitted by way of the stringers to report a continuous link between start and end walls enclosing a raised floor. The array of stringers and stanchions may be labeled using unique identifiers to identify each of the stringers and stanchions in the array. As a result, the location of an issue relating to the structural integrity of the raised floor may be accurately and reliably determined.

In a proposed embodiment, the receiver may be configured to receive the transmitted signal only when the stringer is present. In some embodiments, the stringer may be present when the stringer is in at least one predetermined configuration and in a predetermined position. In this way, the transmitted signal may only be received by the receiver when the stringer is present and correctly positioned, i.e. in a predetermined configuration and/or position. As a result, the accuracy of representing an optimal structural integrity of each stringer in the array of stringers and stanchions may be increased. This may enable the sensitivity of determining the structural integrity of the raised floor to be improved, which may consequently improve the reliability of determining the structural integrity of the raised floor.

In some embodiments, the status of the stringer may comprise at least one of a presence, a non-presence, a position, an alignment, and a degree of damage. In this way, a wider range of possible structural failures experienced by the raised floor may be detected. Consequently, the risk of a structural failure occurring may be reduced, which may improve the safety of the raised floor.

In a proposed embodiment, the processing unit may be further configured to determine that the stringer is present, in response to the receiver receiving the signal. The processing unit may then be configured to, in response to the receiver not receiving the signal, determine that the stringer is not present. In this way, receiving the transmitted signal may indicate a structurally sound raised floor, whereas not receiving the transmitted signal may indicate an issue with the structural integrity of the raised floor. This may enable the structural integrity of the raised floor to be determined accurately and reliably, without requiring the array of stringers and stanchions to be physically assessed. As a result, the efficiency of determining the structural integrity of the raised floor is improved, while the required maintenance cost and time is reduced.

In a proposed embodiment, the signal may comprise a light signal and an electrical signal. In this way, the time taken to transmit and receive the signal may be reduced, which may reduce the time required to determine the structural integrity of the raised floor. As a result, the efficiency of the system may be increased, which may improve the safety of the raised floor.

In some embodiments, the electrical signal may be transmitted by way of the stringer. In this way, the need for additional components may be mitigated. As such, the cost and complexity of the system, as well as the initial installment and possible future maintenance of the system may be reduced.

In some embodiments, the system may further include a communication medium coupled to the stringer, wherein the signal may be transmitted by way of the communication medium. In some embodiments, the communication medium may include an optical fiber and an electrical wire. In this way, a dedicated communication channel for transmitting the signals may be provided. As a result, the accuracy and reliability of transmitting the signals may be improved, which may improve the accuracy and reliability of determining an indicator of a structural integrity of the raised floor.

In a proposed embodiment, the processing unit may include an alert unit configured to provide an alert in response to the processing unit determining the stringer is not present, wherein the alert may include the indicator of the structural integrity of the raised floor. In some embodiments, the alert may include at least one of a notification, an audible alert, and a visual alert. In this way, users of the raised floor may be automatically alerted in response to an issue relating to the structural integrity of the raised floor being detected. The alert may enable the users to be notified of a detected fault or issue with the raised floor without having to remove the floor tiles of the raised floor and physically/visually assessing the array of stringers and stanchions (i.e. the underpinning grid infrastructure of the raised floor). Consequently, the response time to resolving a potential fault with the structural integrity of the raised floor may be reduced, which may improve the safety of the raised floor.

In some embodiments, the system may further comprise a light source located on the raised floor, wherein the visual alert may comprise a light emitted from the light source, wherein the emitted light may be configured to identify the status of the stringer. In this way, users of the raised floor may be immediately alerted to an issue relating to the structural integrity of the raised floor by a light source on the raised floor. This may reduce the need for accessing a messaging service to receive the alert, and may enable a faster response time in reacting to a potential detected fault/issue. Additionally, the light source may enable the exact location of the detected faulty stringer to be identified. As a result, the accuracy and reliability of determining the structural integrity of the raised floor may be improved.

In a proposed embodiment, the processing unit may comprise a mapping unit configured to map a grid network to the array of stringers and stanchions based on the determined status of each of the stringers, wherein the processing unit may further be configured to determine an indicator of the structural integrity of the raised floor based on the grid network. In this way, the grid network may enable the status of each stringer of the array of stringers and stanchions to be accurately and reliably determined. The grid network may further enable the exact location of an issue relating to the structural integrity of the raised floor to be determined efficiently. Consequently, the time taken to identify the location of the issue may be reduced, which may reduce the time taken to act upon and resolve the issue.

In a proposed embodiment, the transmitter and the receiver may be located on the perimeter of the array of stringers and stanchions, wherein the transmitter and the receiver may be located at each end of a stringer run. In this way, each stringer run (i.e. a row/column of stringers in an array of stringers and stanchions) may be assessed for potential issues/faults relating to the structural integrity of the raised floor. As a result, the number of transmitters and receivers required by the system in order to accurately and reliably determine the structural integrity of the raised floor may be reduced. This may enable the efficiency of the system to be improved without compromising the reliability of the system.

FIG. 1 depicts a simplified block diagram of an exemplary embodiment of a system for determining a structural integrity of a raised floor comprising an array of stringers and stanchions. Each stringer is supported at opposite ends by a respective pair of stanchions.

The system comprises a transmitter 310 configured to transmit a signal between a pair of stanchions 306 via a respective stringer 304. The system further comprises a receiver 320, configured to receive the transmitted signal, and a processing unit 330 configured to determine a status of the stringer 304 based on the received signal, then determine an indicator of a structural integrity of a raised floor based on the determined status.

In an embodiment, the receiver 320 is configured to receive the transmitted signal only when the stringer 304 is present. A missing/faulty stringer 304 prevents the continued signal communication and thus an error is raised. In an embodiment, the processing unit 330 is further configured to, in response to the receiver 320 receiving the signal, determine the stringer 304 is present. The processing unit 330 is then configured to, in response to the receiver 320 not receiving the signal, determine the stringer 304 is not present.

In an embodiment, the stringer 304 is present when the stringer 304 is in at least one of a predetermined configuration and a predetermined position. If a stringer 304 is not in the predetermined configuration or the predetermined position, a non-presence of the stringer 304 is determined. In an example, this is due to the stringer 304 being faulty or missing, such that the signal cannot be transmitted. The full distance between a transmitter 310 and a receiver 320 is not reached by the signal, therefore a value lower than the known distance between the transmitter 310 and the receiver 320 is detected. This indicates a potential problem relating to the structural integrity of the raised floor. For example, the configuration and position of the stringer 304 may be different to the predetermined configuration and the predetermined position due to the stringer being damaged, faulty, lost, or misaligned.

In an embodiment, the status of the stringer 304 comprises at least one of a presence, a non-presence, a position, an alignment, and a degree of damage. For example, the status may provide quantitative and/or qualitative representations of the presence, non-presence, position, alignment, and/or degree of damage of the stringer. For instance, the status is a representation with respect to the predetermined configuration and predetermined position of the stringer.

In an embodiment, the signal comprises one of a light signal and an electrical signal. For example, the electrical signal is a low power electrical signal. The power for the signal is provided by way of a powered communication port (e.g. located at the wall 302 surrounding the raised floor). In another example, each stanchion 306 is electrically coupled to a long-life battery which provides the power for the signal. In another embodiment, the processing unit 330 is configured to indicate that each battery is present, and provide a notification indicating a need to change a battery in response to the charge in the battery being low.

In an embodiment, the electrical signal is transmitted by way of the stringer 304. For example, both the stringers 304 and stanchions 306 are made from a metal (e.g. steel). Thus, a low-powered electrical signal can be transmitted using the stringers 304 and stanchions 306 as communication mediums without requiring any major modification to the array of stringers 304 and stanchions 306.

In an embodiment, the system further comprises a communication medium 340 coupled to the stringer 304, wherein the signal is transmitted by way of the communication medium 340. In an embodiment, the communication medium 340 comprises one of an optical fiber and an electrical wire. For example, each stringer 304 hosts a path of light (i.e. a light signal) via a dedicated channel (i.e. an optical fiber). An infrared (IR) signal is used to measure where and when a break in the array of stringers 304 and stanchions 306 occurs. In the example, the transmitter 310 emits an infrared signal and the receiver 320 receives the signal. The signal is transmitted by way of an optical fiber coupled to the transmitter 310 and the receiver 320. If the receiver 320 does not receive the IR signal, the status of the one or more stringers 304 along the stringer run connecting the transmitter 310 and the receiver 320 is determined as structurally faulty. In another example, electrical signals are transmitted by way of the stringers 304 or electrical wires (i.e. a communication medium 340). In another alternative embodiment, reflectors may be employed at each stanchion to reflect a light signal. Also, known distances of each stringer may be used to determine which stringer is missing according to a (non-) received/reflected signal.

The processing unit 330 depicted in FIG. 1 is located within the array of stringers and stanchions. In some embodiments, the processing unit 330 is located external to the array of stringers and stanchions. In some embodiments, the processing unit 330 is located above the raised floor. In some embodiments, the processing unit 330 is in wireless communication with the transmitter 310 and receiver 320.

In an embodiment, the processing unit 330 comprises a mapping unit (not shown) configured to map a grid network to the array of stringers 304 and stanchions 306 based on the determined status of each of the stringers 304, wherein the processing unit 330 is further configured to determine an indicator of the structural integrity of the raised floor based on the grid network. In an example, the transmitter and the receiver are a manual electric switch (e.g. a dual in-line package (DIP) switch) located at the head of each stanchion 406 in the array of stringers and stanchions. A first switch located on a first stanchion transmits the signal by way of a stringer connected to the first stanchion, and a second switch located on a second stanchion connected to the stringer receives the signal. Each switch has an associated unique identifier (e.g. a binary identifier). Consequently, each stanchion is associated with a unique identifier. Thus, the grid network comprises network nodes and network vertices, wherein the network nodes comprise the stanchions and the network vertices comprise the stringers. Each of the network nodes is assigned one or more identifiers, wherein each of the one or more identifiers represents a connection between one of the stanchions and one of the stringers.

Figure 2:
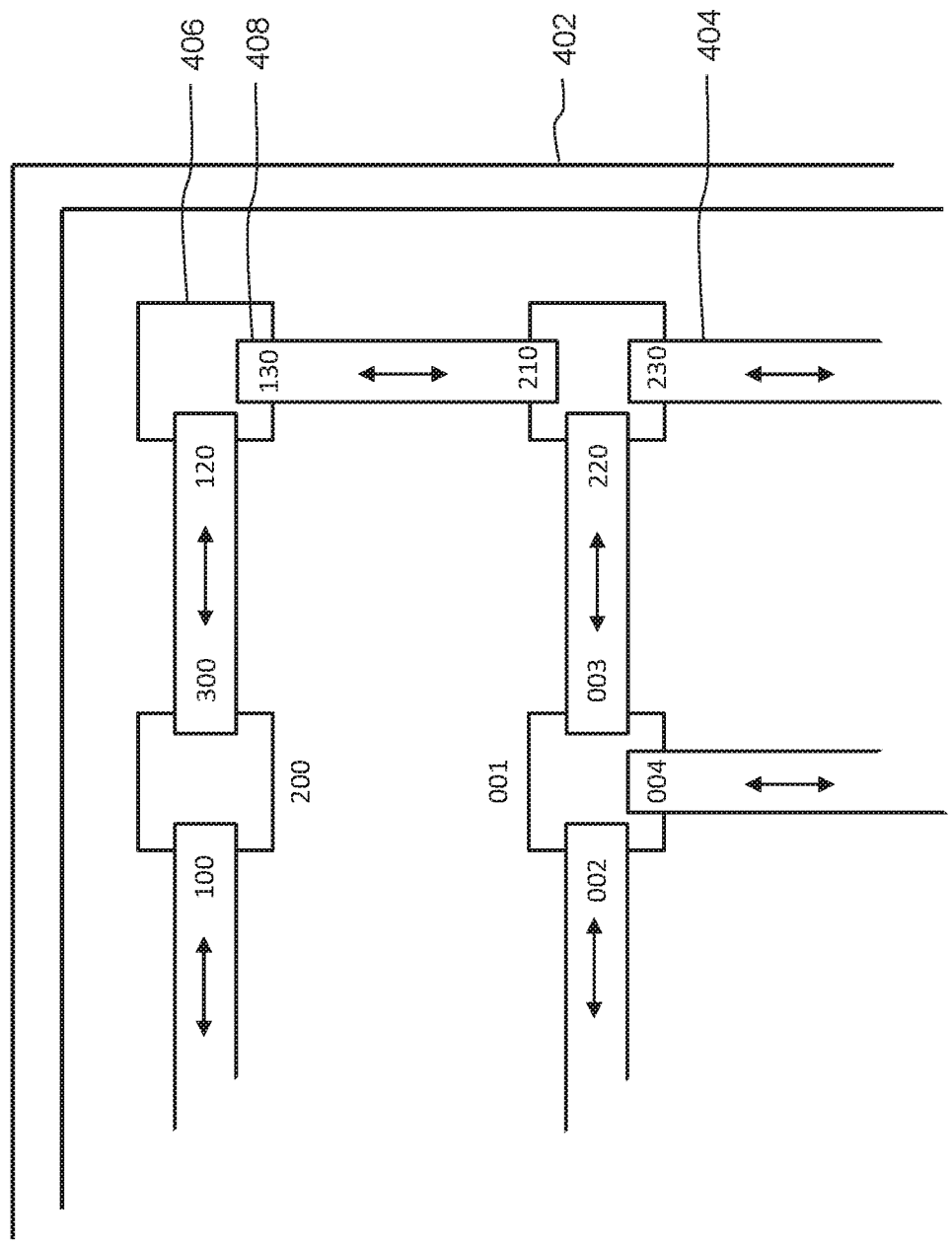
FIG. 2 is a simplified block diagram of an exemplary embodiment of a system for determining a structural integrity of a raised floor comprising an array of stanchions and stringers, accordance with embodiments of the present disclosure.

FIG. 2 depicts a grid array of stringers 404 and stanchions 406, wherein some stanchions 406 can host four stringers 404 (i.e. each stanchion has four possible connections 408 available). Stanchions 406 along an edge of the array can host three stringers 404, and stanchions 406 in a corner of the array can host two stringers 404. For full structural integrity, each stringer 404 hosted by/connected to a stanchion 406 should be within a predetermined configuration and position. In the example, each connection 408 of the stanchion 406 to a stringer 404 comprises a switch and associated unique identifier. Thus, a stanchion 406 with four available connections 408 has four associated identifiers, each identifier representing a connection 408. For example, a first stanchion has associated identifiers 001, 002, 003, and 004. Each identifier can be implemented by a DIP switch. A second stanchion has associated identifiers 100, 200, and 300. The communication (i.e. the stringer) from the first stanchion and the second stanchion links identifier 001 to identifier 200. Without a stringer in place between 001 and 200 (i.e. not within the predetermined configuration and position), the DIP switch represented by identifier 001 is not able to communicate with the DIP switch represented by identifier 200. As a result, the signal is transmitted by way of peer DIP switches (i.e. DIP switches represented by identifiers 002, 003, 004, 100, and/or 300), in a similar way to how a network router would route traffic if a switch is offline.

Figure 3:
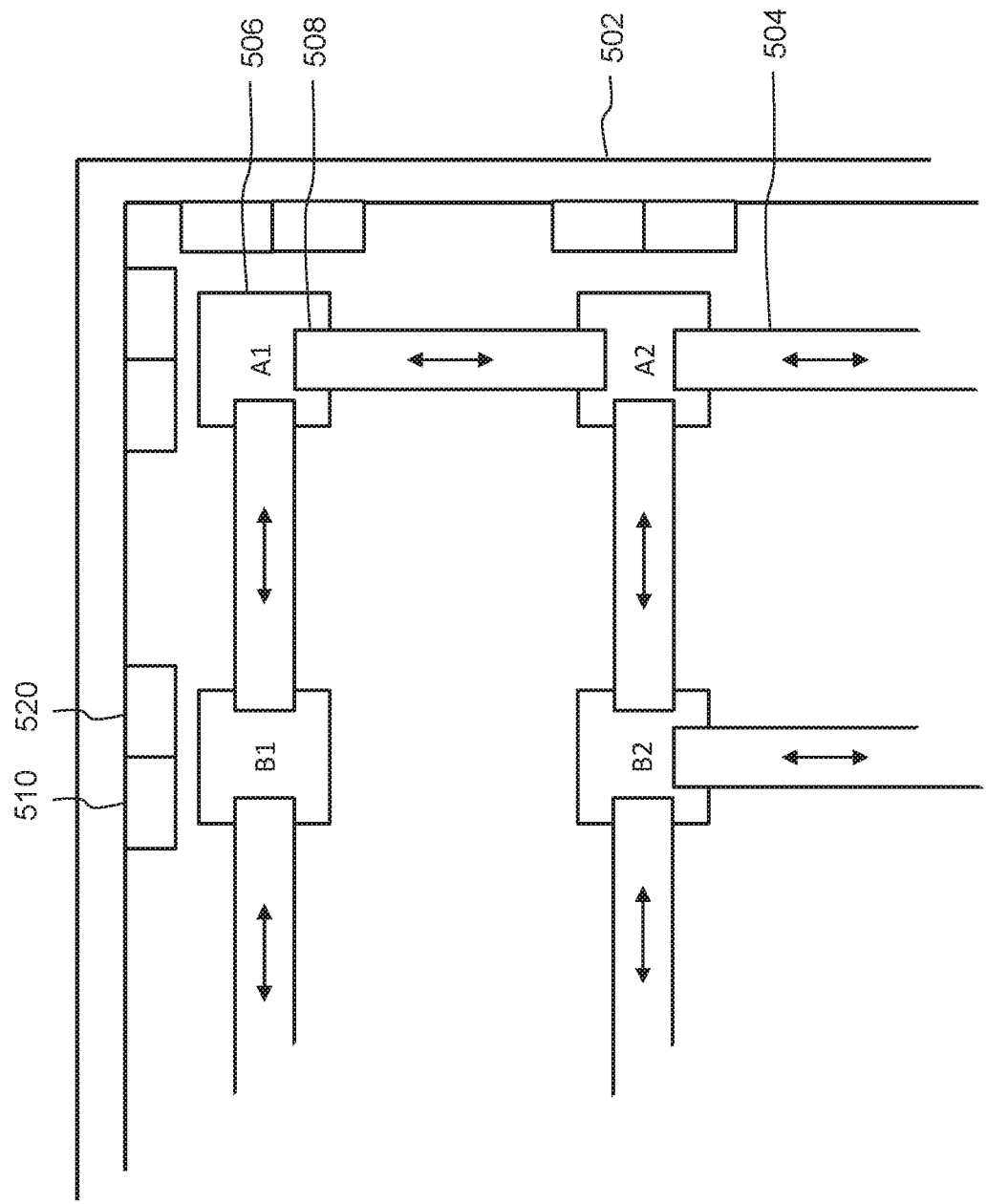
FIG. 3 is a simplified block diagram of an exemplary embodiment of a system for determining a structural integrity of a raised floor comprising an array of stanchions and stringers, accordance with embodiments of the present disclosure.

In another example depicted in FIG. 3, each stanchion 506 has an associated grid reference A1, A2, B1, B2. The transmitter 510 and the receiver 520 are located on the perimeter of the array of stringers 504 and stanchions 506, wherein the transmitter and the receiver are located at each end of a stringer run. FIG. 1 and FIG. 3 depict an example where the transmitter 310, 510 and the receiver 320, 520 are coupled to the wall 302, 502 surrounding the raised floor. In an example, the transmitter 510 and the receiver 520 are electrically coupled to the stringers 504 and stanchions 506. In another example, the transmitter 510 and the receiver 520 are communicatively coupled to the stringers 504 and the stanchions 506.

In FIG. 1, a transmitter 310 and a receiver 320 are located at each end of each stringer run in the array of stringers and stanchions. For instance, the transmitter 310 is coupled to one end of the stringer run, and the corresponding receiver 320 is couple to the other end of the stringer run. As a result, each stringer 304 in the stringer run is enabled to transmit the transmitted signal. As depicted in FIG. 1, a transmitter 310 and a receiver 320 may be coupled to each end of the stringer run, resulting in two communication paths for each stringer run. In another embodiment as depicted in FIG. 3, only one end of the stringer run is coupled to the transmitter 510 and the receiver 520, resulting in one communication path for each stringer run. A signal is periodically emitted from the transmitter 510 and transmitted by way of the stringers 504 in the corresponding stringer run. Each stanchion 506 in the stringer run is configured to reflect the signal to the receiver 520, e.g. using a partial mirror therefore dropping the signal by a set percentage at each length of the path. A missing or damaged stringer 504 between two stanchions 506 prevents the signal from being transmitted between the two stanchions. In response to the receiver 520 not receiving the signal, the processing unit 330 determines the stringer between the two stanchions is not present.

Figure 4B:
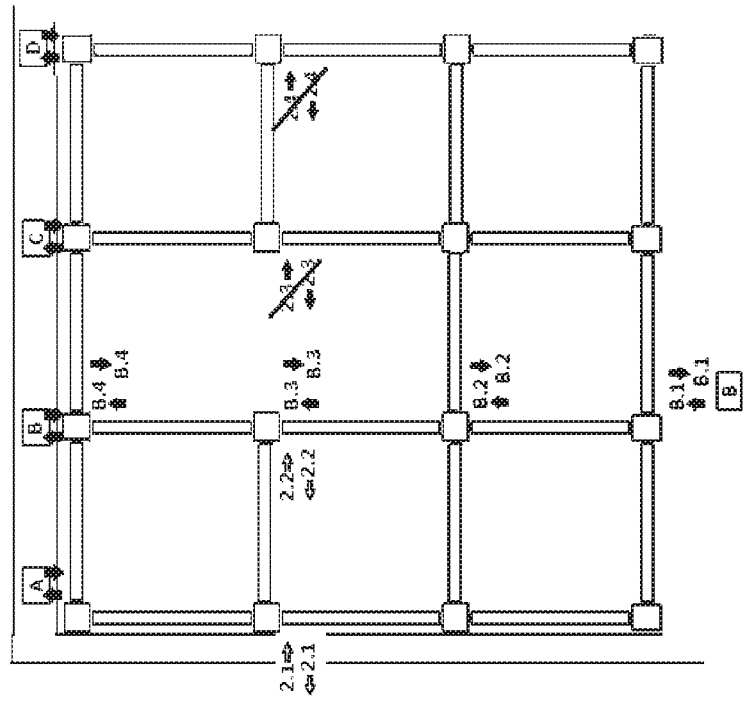
FIGS. 4A and 4B are simplified block diagrams of an exemplary embodiment of a system for determining a structural integrity of a raised floor comprising an array of stanchions and stringers, accordance with embodiments of the present disclosure.
Figure 4A:
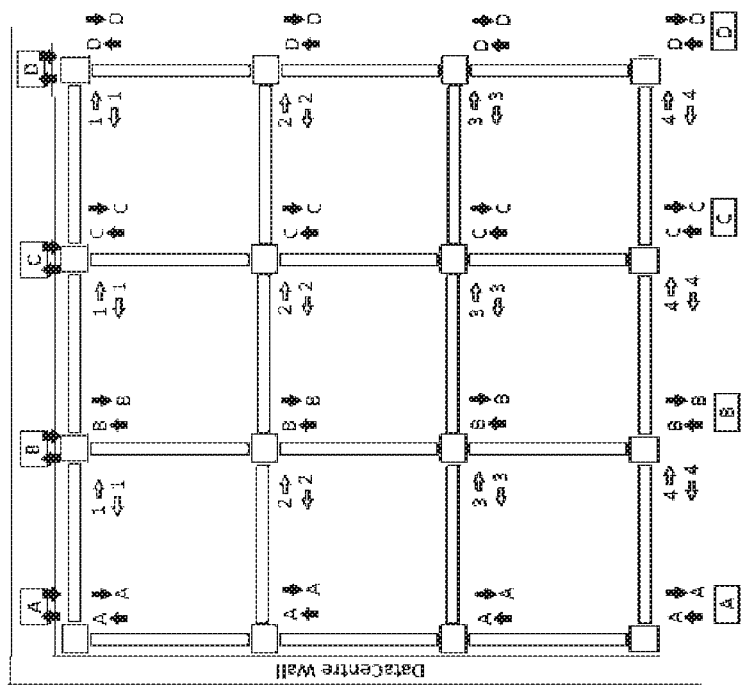

FIG. 4A and FIG. 4B expand on the concept depicted in FIG. 3 by depicting another exemplary embodiment, where each stringer run comprises a transmitter/receiver pair A, B, C, D (shown) and 1, 2, 3, 4 (not shown). For instance, the transmitter A, hosted at one end of a stringer run, transmits a signal along the stringer run to receiver A, hosted at the other end of the stringer run, where the signal is received. Thus, a continuous link is reported for each stringer run. FIG. 4A depicts a structurally sound raised floor, where each stringer is present and in its predetermined configuration and position. FIG. 4B depicts a structural fault in the raised floor. Each stanchion has a grid reference (A.1, A.2, B.1, B.2, 1.1, 1.2, 2.1, 2.2, etc.) to enable a grid network to be mapped. In FIG. 4B, the stringer connecting stanchions B.3 and C.3 (also referred to as 2.3) is not present (i.e. the stringer is missing). Thus, stanchions B.3 and C.3 are no longer able to communicate. The processing unit 330 determines the status of the stringer as not present, indicating a structural failure in the raised floor.

In the case of localized/general maintenance of the array of stringers and stanchions, the system may be aware that certain/all stringers are affected by the maintenance, and are therefore temporarily excluded from the grid network.

In an embodiment, the processing unit 330 comprises an alert unit 332 configured to provide an alert in response to the processing unit 330 determining the stringer 304 is not present, wherein the alert comprises the indicator of the structural integrity of the raised floor. In an embodiment, the alert comprises at least one of a notification, an audible alert, and a visual alert. In an embodiment, the system further comprises a light source 350 located on the raised floor, wherein the visual alert comprises a light emitted from the light source, wherein the emitted light is configured to identify the status of the stringer 304.

Figure 5:
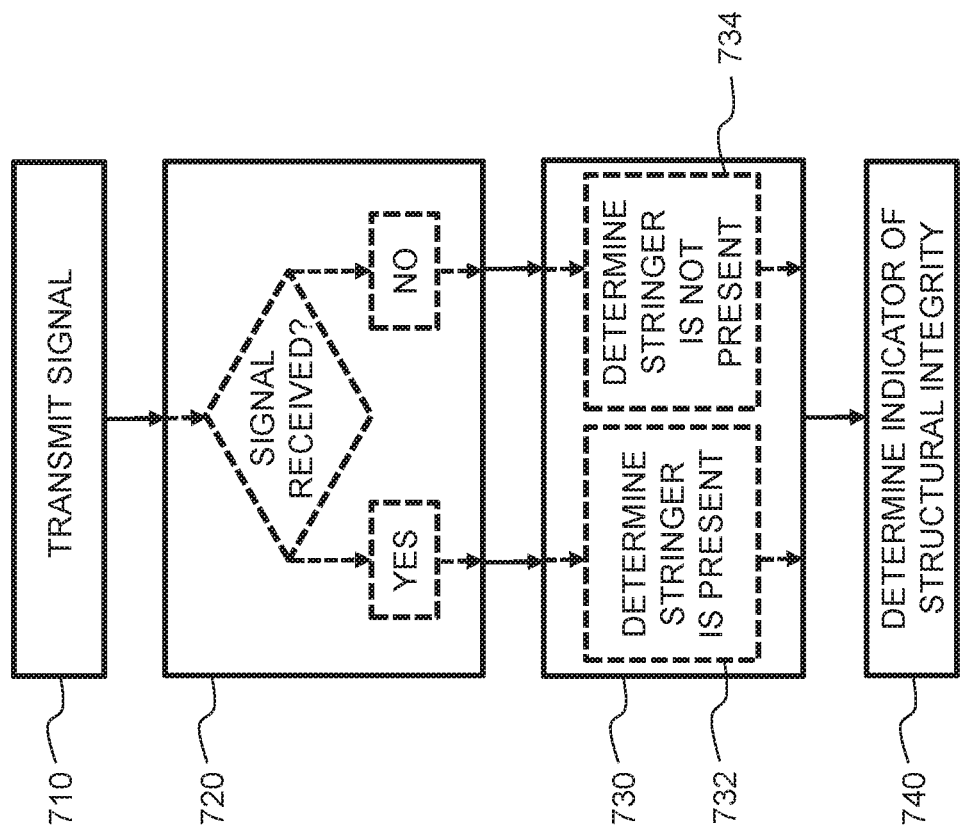
FIG. 5 is a flow diagram of a method for determining a structural integrity of a raised floor comprising an array of stanchions and stringers, each stringer being supported at opposite ends by a respective pair of stanchions, accordance with embodiments of the present disclosure.

FIG. 5 depicts a flow diagram of a computer-implemented method for determining a structural integrity of a raised floor comprising an array of stanchions and stringers. Each stringer is supported at opposite ends by a respective pair of stanchions.

Step 710 comprises transmitting a signal between a pair of stanchions via a respective stringer. In an embodiment, the signal comprises one of a light signal and an electrical signal.

Step 720 comprises receiving the transmitted signal. In an embodiment, receiving the transmitted signal comprises receiving the transmitted signal only when the stringer is present. In an embodiment, the stringer is present when the stringer is in at least one of a predetermined configuration and a predetermined position.

Step 730 comprises determining a status of the stringer based on the received signal. In an embodiment, the status of the stringer comprises at least one of a presence, a non-presence, a position, an alignment, and a degree of damage.

In an embodiment, determining a status of the stringer based on the received signal comprises steps 732 and 734. Step 732 comprises, in response to receiving the signal, determining the stringer is present. Step 734 comprises, in response to not receiving the signal, determining the stringer is not present.

Step 740 comprises determining an indicator of a structural integrity of a raised floor based on the determined status. In an embodiment, determining the stringer is not present comprises step 735. Step 735 comprises providing an alert in response to determining the stringer is not present, wherein the alert comprises the indicator of the structural integrity of the raised floor.

In an embodiment, the alert comprises at least one of a notification, an audible alert, and a visual alert.

In an embodiment, determining an indicator of a structural integrity of a raised floor comprises steps 742 and 744. Step 742 comprises mapping a grid network to the array of stringers and stanchions based on the determined status of each of the stringer. Step 744 comprises determining an indicator of the structural integrity of the raised floor based on the grid network.

By way of further example, as illustrated in FIG. 6, embodiments may comprise a computer system 70, which may form part of a networked system 7. For instance, a transmitter and a receiver may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random-access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for determining a structural integrity of a raised floor comprising an array of stanchions and stringers, according to a proposed embodiment.

Program/utility 78, having a set (at least one) of program modules 79, may be stored in memory 74. Program modules 79 generally carry out the functions and/or methodologies of proposed embodiments for determining a structural integrity of a raised floor comprising an array of stanchions and stringers.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for determining a structural integrity of a raised floor comprising an array of stanchions and stringers, each stringer being supported at opposite ends by a respective pair of stanchions, the system comprising:
 a transmitter configured to transmit a signal between a pair of stanchions via a respective stringer;
 a receiver configured to receive the signal only when the stringer is present; and
 a processing unit configured to:
  determine a status of the stringer based on the received signal; and
  determine an indicator of a structural integrity of a raised floor based on the determined status.

2. The system of claim 1, wherein the stringer is present when the stringer is in a predetermined configuration and a predetermined position.

3. The system of claim 1, wherein the status of the stringer comprises a degree of damage.

4. The system of claim 1, wherein the processing unit is further configured to: in response to the receiver receiving the signal, determine the stringer is present; and in response to the receiver not receiving the signal, determine the stringer is not present.

5. The system of claim 4, wherein the processing unit is further configured to provide an alert in response to the processing unit determining the stringer is not present, wherein the alert comprises the indicator of the structural integrity of the raised floor.

6. The system of claim 1, wherein the signal comprises an electrical signal.

7. The system of claim 6, wherein the electrical signal is transmitted by way of the stringer.

8. The system of claim 1, further comprising a communication medium coupled to the stringer, wherein the signal is transmitted by way of the communication medium.

9. The system of claim 8, wherein the communication medium comprises one of an optical fiber and an electrical wire.

10. The system of claim 5, wherein the alert comprises at least one of a notification, an audible alert, and a visual alert.

11. The system of claim 10, further comprising a light source located on the raised floor, wherein the visual alert comprises a light emitted from the light source, wherein the emitted light is configured to identify the status of the stringer.

12. The system of claim 1, wherein the processing unit is further configured to map a grid network to the array of stringers and stanchions based on the determined status of each of the stringers, wherein the processing unit is further configured to determine an indicator of the structural integrity of the raised floor based on the grid network.

13. The system of claim 1, wherein the transmitter and the receiver are located on the perimeter of the array of stringers and stanchions, wherein the transmitter and the receiver are located at each end of a stringer run.

14. A method for determining a structural integrity of a raised floor comprising an array of stanchions and stringers, each stringer being supported at opposite ends by a respective pair of stanchions, the method comprising:
 transmitting a signal between a pair of stanchions via a respective stringer;
 receiving the signal only when the stringer is present; and
 determining a status of the stringer based on the received signal; and
 determining an indicator of a structural integrity of a raised floor based on the determined status.

15. The method of claim 14, wherein the signal comprises an electrical signal.

16. The method of claim 14, wherein transmitting the signal is performed by a communication medium.

17. A computer program product comprising a computer readable storage medium having program instruction embodied therewith, the program instructions executable by a processor to cause the processor to perform a method for determining a structural integrity of a raised floor comprising an array of stanchions and stringers, each stringer being supported at opposite ends by a respective pair of stanchions, the method comprising:
 transmitting a signal between a pair of stanchions via a respective stringer;
 receiving the signal only when the stringer is present; and
 determining a status of the stringer based on the received signal; and
 determining an indicator of a structural integrity of a raised floor based on the determined status.

18. The computer program product of claim 17, wherein the signal comprises an electrical signal.

19. The computer program product of claim 17, wherein transmitting the signal is performed by a communication medium.

* * * * *